United States Patent [19]

Azam et al.

[11] 4,184,956
[45] Jan. 22, 1980

[54] APPARATUS FOR TREATING WASTE-WATERS AND SLUDGES, COMPRISING AN IRRADIATION SYSTEM USING ACCELERATED CHARGED PARTICLES

[75] Inventors: Guy Azam; André Bensussan; Claude Levaillant; Harry Huber; Emile Mevel; Dominique Tronc, all of Buc, France

[73] Assignee: C.G.R. MeV, Inc., Paris, France

[21] Appl. No.: 942,197

[22] Filed: Sep. 14, 1978

[30] Foreign Application Priority Data

Sep. 16, 1977 [FR] France .............................. 77 28072

[51] Int. Cl.² ............................................. C02B 3/00
[52] U.S. Cl. .................................. 210/103; 210/110; 210/137; 210/199; 210/209; 250/527
[58] Field of Search ................. 250/527; 204/158 HE, 204/157.1 H; 210/103, 110, 134, 137, 143, 198 R, 199, 202, 195 R, 209, 222, 223, 254, 259, 152

[56] References Cited

U.S. PATENT DOCUMENTS

| 2,602,751 | 7/1952 | Robinson | 204/158 HE |
|---|---|---|---|
| 2,892,946 | 6/1959 | Dewey | 204/158 HE |
| 2,897,365 | 7/1959 | Dewey | 204/158 HE |
| 2,907,704 | 10/1959 | Trump | 204/158 HE |
| 2,976,422 | 3/1961 | Hill | 250/527 |
| 3,113,087 | 12/1963 | Godrington | 250/527 |
| 3,147,213 | 9/1964 | Byron et al. | 204/157.1 H |
| 3,418,155 | 12/1968 | Colvin | 204/158 HE |
| 3,553,089 | 1/1971 | Mytelka | 204/158 HE |
| 3,677,935 | 7/1972 | Spragg | 210/3 |

FOREIGN PATENT DOCUMENTS

| 2529503 | 6/1975 | Fed. Rep. of Germany | 204/158 HE |
|---|---|---|---|
| 591468 | 1/1960 | United Kingdom | 204/158 HE |

OTHER PUBLICATIONS

Ballantine, "The Practicality of Using Atomic Radiation for Wastewater Treatment", Journal WPCF, Mar. 1969, pp. 445–458.
Chemical and Engineering News, vol. 33, No. 114, Apr. 4, 1955, p. 1425.

Primary Examiner—Charles N. Hart
Assistant Examiner—Ernest G. Therkorn
Attorney, Agent, or Firm—Cushman, Darby & Cushman

[57] ABSTRACT

An apparatus for treating waste-waters and sludges and using an irradiation beam of accelerated electrons, comprises a treatment circuit c equipped with valves, an electromagnetic regulator providing a constant flow of the fluid to be treated by the irradiation beam, systems for controlling the flow of fluid and for controlling the characteristics of the irradiation beams, a microprocessor associated with the flow control systems for controlling at least the automatic closure of a shut-off valve and the opening of a purge valve.

8 Claims, 7 Drawing Figures

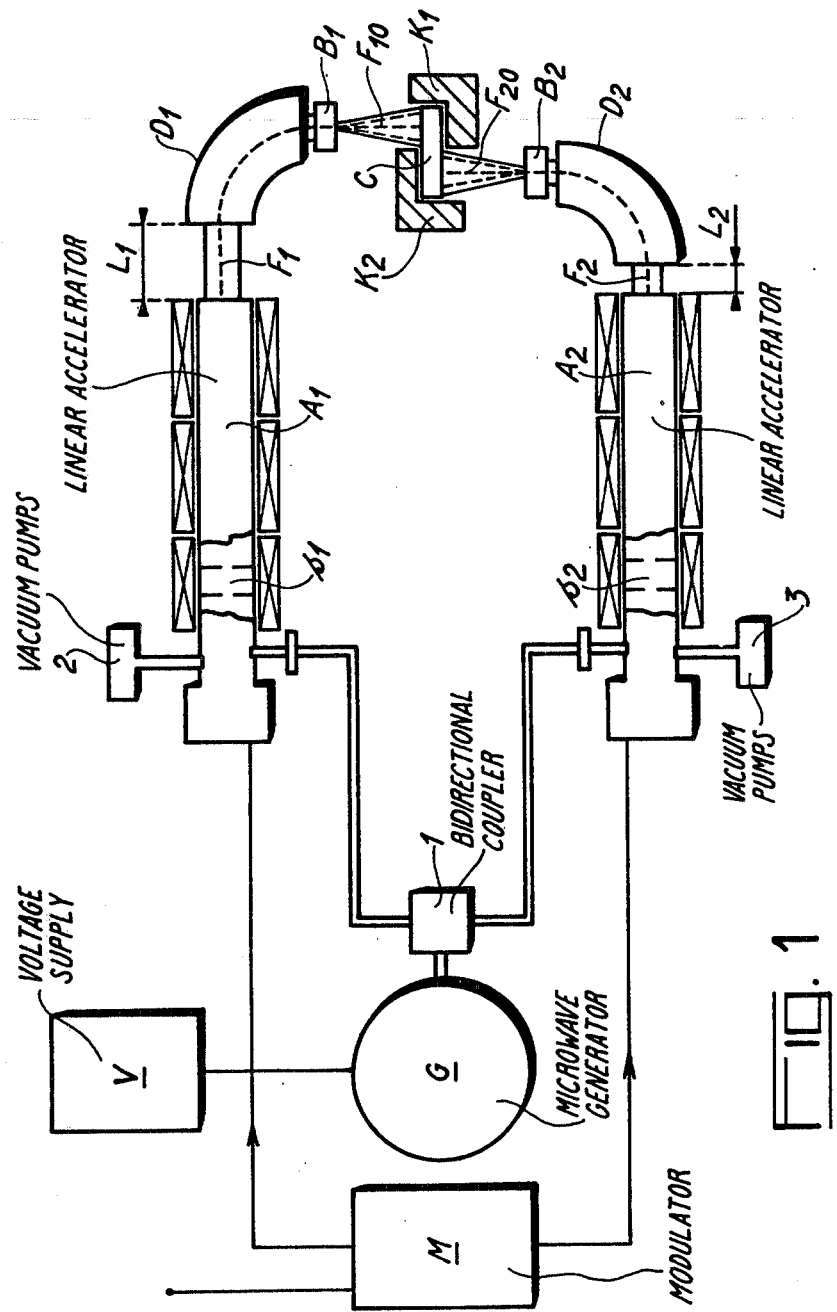

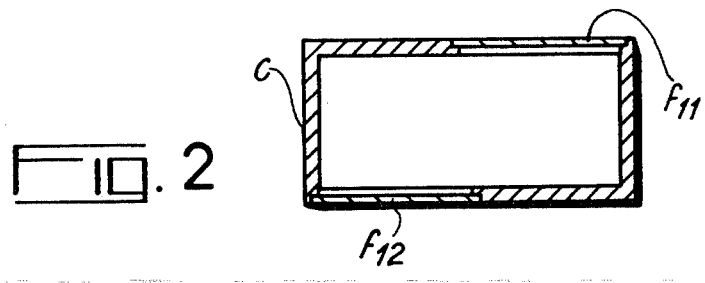
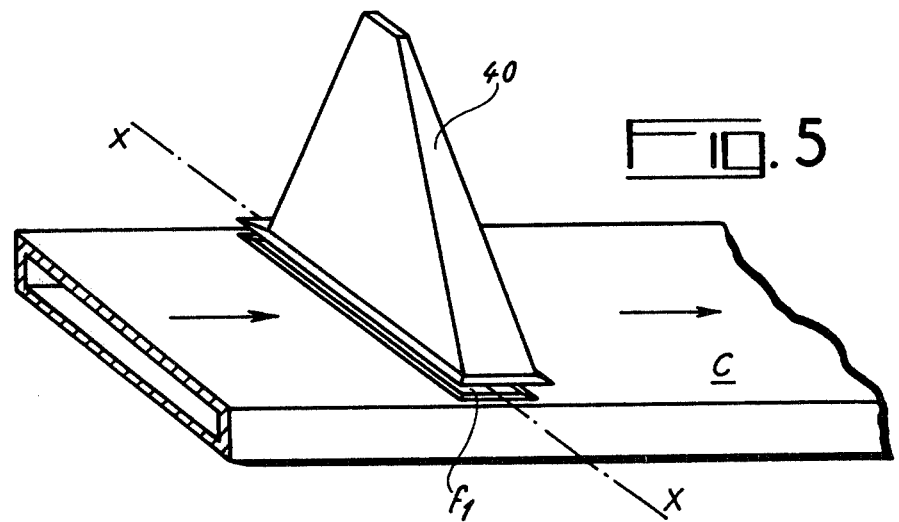
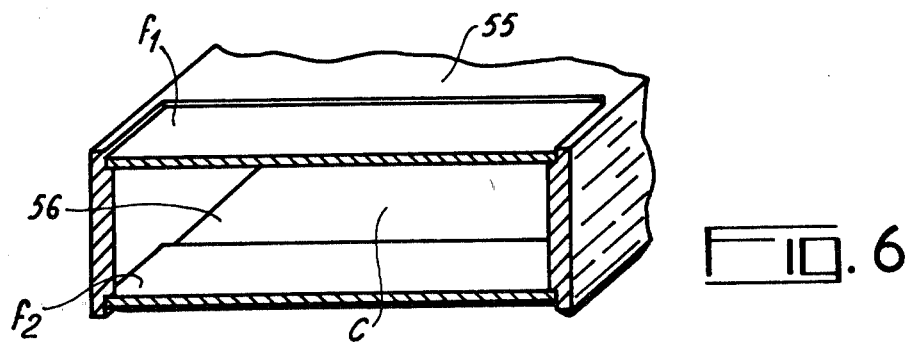

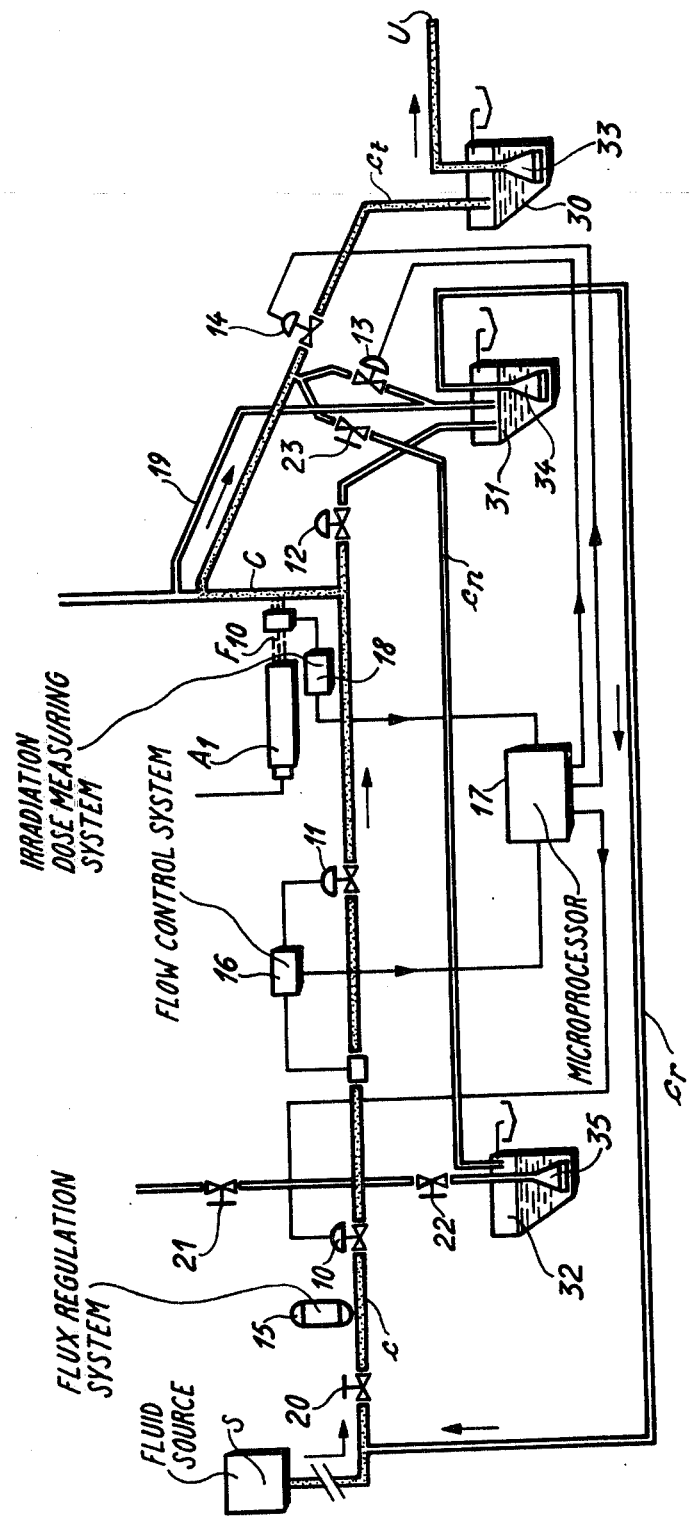

APPARATUS FOR TREATING WASTE-WATERS AND SLUDGES, COMPRISING AN IRRADIATION SYSTEM USING ACCELERATED CHARGED PARTICLES

BACKGROUND OF THE INVENTION

This invention relates to an apparatus for treating waste-waters and sludges, and comprising an irradiation system providing accelerated charged particles for irradiating the sheet of polluted fluid placed in the path of these particles, the irradiation beams having to be as wide as possible with as high an energy level as possible in order to ensure efficient operation of the apparatus.

It is known that the waste-water and sludge treatment by means of ionising radiation gives a result of much better quality than that obtained by conventional chemical processes.

This ionising radiation may be formed by gamma rays produced by the disintegration of certain radioactive materials, such as coblat 60 for example, although in this case the cost of the treatment is high and the quantities in which these materials are available on a world-wide basis are relatively small by comparison with potential world demand. In addition, the problems give rise to numerous difficulties.

Conventional methods for waste-water treatment before use (upstream fluid) generally comprise:
a biological treatment by filtration on a bed of sand followed by the addition of chlorine,
a chemical treatment by flocculation with chemical additives, followed by ozonisation and/or the addition of chlorine.

Now, the increase in pollution is beginning to reduce the effectiveness of the biological membrane to well below acceptable limits, in addition to which the cost of the chemical additives which have to be used is increasing.

Also, it has been proposed to subject the waste-waters to sterilisation, this method of treatment is only valid in countries where water is scarce and energy inexpensive.

Conventional methods for treating waste-waters and sludges (downstream fluid) comprise separation of the liquid fraction and the solid material. The liquid fraction obtained is then chemically treated in the same way as indicated above, although the treatment of the sludges is at present very expensive (making up 50% of the total cost of treating the waste waters for a volume representing 1/200 of the total volume).

By using the apparatus for waste-water and sludge treatment according to the invention, it is possible to obtain extremely interesting results in regard to the quality and cost of the treatment.

SUMMARY OF THE INVENTION

Accordingly, it is an object of the present invention to provide an apparatus for treating a fluid constituted with waste-waters and sludges, this apparatus being provided with a system for irradiating the fluid by a beam of accelerated charged particles, the irradiation system being associated with a treatment circuit comprising means for obtaining a constant flow of the fluid to be treated, means for controlling this flow, an irradiation channel of predetermined shape which is arranged in the path of the irradiation beam and in which the fluid to be treated is able to circulate, a portion of this channel arranged in the beam path being provided with at least one window transparent to this irradiation beam, the irradiation system being associated with means for measuring and controlling the characteristics of the irradiation beam, and a safety system being associated with said means controlling the characteristics of the irradiation beam and with the system controlling the flow of the fluid to be treated for stopping the flow of the fluid and recycles any fluid which has not been suitably treated.

BRIEF DESCRIPTION OF THE DRAWING

The present invention will become more readily apparent from the following detailed description taken in conjunction with the accompanying drawing in which:

FIGS. 1, 3 and 4 show three examples of embodiments of an irradiation system which may be used in the apparatus for waste-water and sludge treatment according to the present invention.

FIGS. 2, 5 and 6 show details of the apparatus according to the present invention.

FIG. 7 diagrammatically illustrates all the circuits of an apparatus for waste-water and sludge treatment according to the invention.

DESCRIPTION OF THE PREFERRED EMBODIMENT

Figure 3:
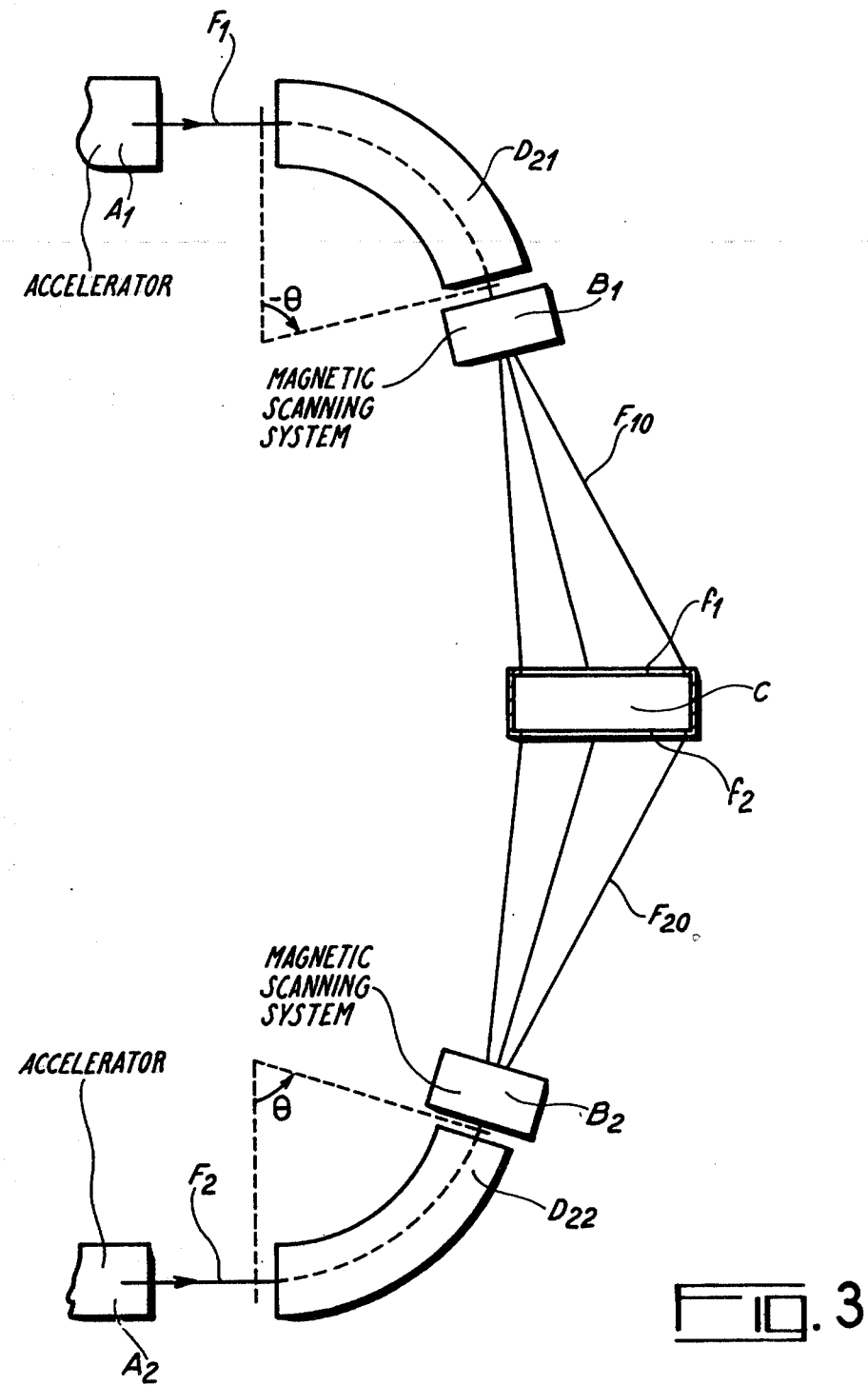

FIG. 1 shows a first example of an irradiation system which may be used in the apparatus for treating waste-waters and sludges according to the invention. This irradiation system comprises two linear electron accelerators $A_1$ and $A_2$ which are fed with a single high-voltage source M (for example a modulator). A high-frequency generator G (a klystron in the example illustrated) connected to a voltage supply V enables the accelerating structures $s_1$ and $s_2$ of the accelerators $A_1$ and $A_2$, respectively, to be supplied with microwave energy, a bidirectional coupler 1 associated with the generator G ensuring the microwave feeding of these accelerating sections $s_1$, $s_2$. Vacuum pumps 2 and 3 are respectively connected to each of the accelerators $A_1$, $A_2$ to establish a suitable vacuum in the vacuum chambers of the accelerators $A_1$, $A_2$ in operation.

Magnetic deflectors $D_1$ and $D_2$ are arranged downstream of the accelerators $A_1$ and $A_2$ and at respective distances $L_1$ and $L_2$ from the output end of these accelerators $A_1$ and $A_2$ enabling the beams $F_1$ and $F_2$ of accelerated particles issuing respectively from the accelerators $A_1$ and $A_2$ to be respectively deflected through an angle $\theta$ and an angle $-\theta$. In this example of embodiment, the angle $\theta$ is equal to 90°.

Two magnetic scanning systems $B_1$ and $B_2$ are arranged downstream of the magnetic deflectors $D_1$ and $D_2$, supplying two scanning beams $F_{10}$ and $F_{20}$ having elongations $d_1$ and $d_2$.

A duct C, for example of rectangular cross-section, in which the fluid to be treated may circulate, is placed in the path of the scanning beams $F_1$ and $F_2$, this duct C being provided with two windows $f_1$ and $f_2$ as shown in FIG. 6 and transparent to the beams $F_{10}$ and $F_{20}$, these windows $f_1$ and $f_2$ enabling the circulating fluid to be irradiated. In the example shown in FIG. 1, the duct C of rectangular cross-section is perpendicular to the scanning plane of the beams $F_{10}$ and $F_{20}$. This duct C may be made of stainless steel whilst the windows $f_1$ and $f_2$ may be made of titanium for example. The distances $L_1$ and $L_2$ (FIG. 1) respectively separating the deflectors $D_1$ and $D_2$ from the output ends of the accelerators $A_1$ and $A_2$ are selected in such a way that the sum d of the elongations $d_1$ and $d_2$ of the beams $F_{10}$ and $F_{20}$ are substantially equal to the width of the duct in which the fluid to be treated may circulate. The windows $f_1$ and $f_2$, (FIG. 1) of which the length are substantially equal to the length of the duct C, i.e. equal to the width of the sheet of fluid to be treated, are arranged opposite one another in the example illustrated in FIG. 1.

In FIG. 2, two windows $f_{11}$ and $f_{12}$ replace respectively the windows $f_1$ and $f_2$ of FIG. 1, these windows $f_{11}$ and $f_{12}$ having lengths substantially equal to half the length of the duct C.

Shielded screens $K_1$, $K_2$ (FIG. 1) partly surround that part of the duct C which carries the windows $f_1$, $f_2$ (or $f_{11}$, $f_{12}$).

FIG. 3 shows a second example of embodiment of an irradiation system which may be used in the apparatus according to the invention.

Magnetic scanning systems $D_{21}$, $D_{22}$ are arranged downstream of the accelerators $A_1$, $A_2$ at the same distance $(L_1=L_2)$ therefrom, being intended respectively to deflect the beams $F_1$, $F_2$ through angles $|\theta|$ with $\theta<90°$ so that the mean trajectories of the scanning beams $F_{10}$ and $F_{20}$ impinge obliquely on the windows $f_1$, $f_2$ of the duct C. The disturbances to which the interferences of the beams $F_{10}$ and $F_{20}$ could give rise in operation are thus avoided. If in every case the beams $F_{10}$ and $F_{20}$ have the same energy and the same scanning angle, the sheet of fluid which can be effectively treated with the irradiation system shown in FIG. 3 will be half as wide and twice as thick as the sheet which can be treated with the irradiation system shown in FIG. 1.

Figure 4:
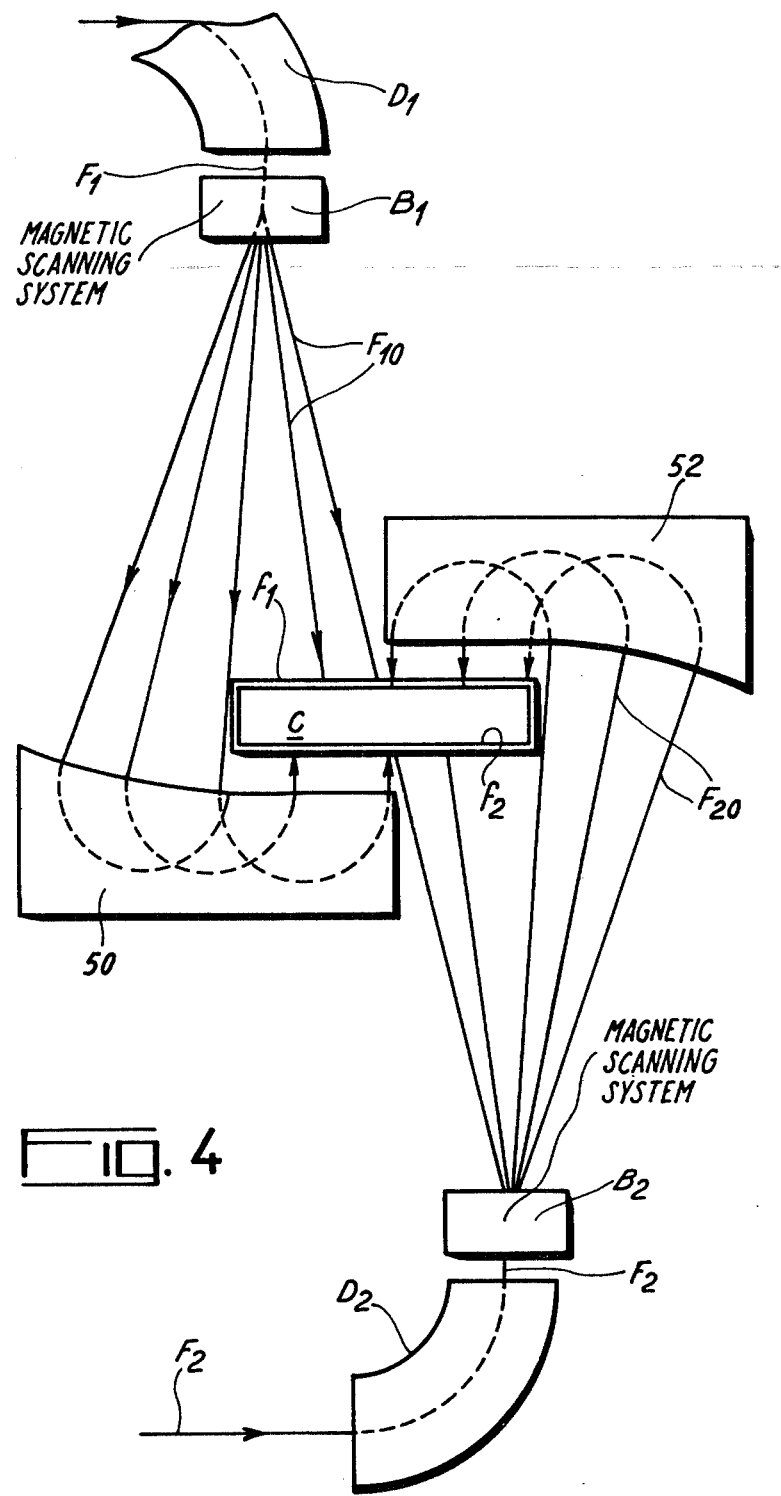

FIG. 4 shows a third example of embodiment of an irradiation system which may be used in the treatment apparatus according to the invention. Each of the accelerators $A_1$ and $A_2$ (not shown in FIG. 4) are associated with means for irradiating the sheet of fluid on two sides, as described in French Patent Application No. 77.20 376. Each of the scanning beams $F_{10}$ and $F_{20}$ is partly subjected to the action of a magnetic field created between the pole pieces 50, 51 and 52, 53 of two electromagnets (only the pole pieces 50 and 52 are visible in FIG. 4). In operation, each of the beams $F_{10}$ and $F_{20}$ thus irradiates half the two opposite faces of the duct, through the windows $f_1$, $f_2$. The quantity of fluid treated per minute is thus significantly increased. Shields of heavy metal (for example lead) are provided around the treatment zone. These shields of conventional type have not been shown in FIGS. 1, 3 and 4.

FIG. 5 shows the irradiation duct C and one of its vacuum chambers 40, or scanning horn, in which one of the scanning beams moves, the duct being provided with windows $f_1$ and $f_2$ opposite the scanning beams $F_{10}$, $F_{20}$, as shown in the detail of FIG. 5. In this embodiment (FIG. 6), the walls 55 and 56 of the duct C have shoulders on which the windows $f_1$ and $f_2$ are arranged and brazed. These windows $f_1$ and $f_2$, for example of titanium, may have single or double walls, and provision may be made for a cooling fluid to circulate between these double walls.

FIG. 7 diagrammatically illustrates an apparatus for waste-water and sludge treatment according to the invention, this apparatus using one of the irradiation systems of the type described above.

A pipe c of the treatment circuit receives the fluid to be treated, consisting of waste-waters and sludges, from a source S. Automatic valves 10 and 14 and an assembly of valves 20 to 23, which may be manual or automatic, are provided in the treatment circuit. The roles of these various valves will be discussed hereinafter.

An electropneumatic system 15 for regulating the flow of fluid to be treated is arranged downstream of the shutoff valve 20 of the treatment circuit and has to provide for a constant flow of this fluid to be treated. A system 16 for controlling the flux of fluid to be treated is connected to a microprocessor 17 by which the valve 10 is automatically closed when the measured flow is not equal to the desired flow value. The system 16 for monitoring flow may also ensure closure of the valve 11 in this case. The irradiation system, of which only one of the accelerators $A_1$ and $A_2$ (i.e. $A_1$) has been shown in FIG. 6, is associated with a system 18 for measuring the irradiation dose delivered by the irradiation beam, this system 18 being connected to the microprocessor 17 controlling closure of the valve 14 and opening of the valve 13. The fluid which has not been suitably treated is then removed by the overflow circuit 19 and returned upstream of the treatment circuit c. During the normal treatment process, the valves 12, 21, 22 and 23 are kept closed.

In operation, the fluid to be treated, coming from the source S and subjected to the system 15 for regulating flow and to the system 16 for controlling flow subsequently enters the duct C for treatment by irradiation and, finally, is removed in the direction of the duty circuit U. When the flow does not correspond to the required flow and/or when the irradiation beams do not have the required characteristics, signals are delivered to the microprocessor 17 which commands the closure of the valve 10 and the valve 14 and the opening of the valves 13 and 12 (so-called purge valves).

An auxiliary cleaning circuit $c_n$ is provided in the treatment apparatus according to the invention, this cleaning circuit $c_n$ being provided with the valve 23 which is normally closed. During the cleaning process, the valves 10, 12, 13 and 14 are closed and the valve 23 is opened. In its open position, the valve 21 enables a cleaning fluid to be introduced, this cleaning fluid subsequently being able to circulate in a closed circuit if the valve 22 is opened and the valve 21 closed. Three tanks 30, 31 and 32 are respectively associated with the circuit $c_t$ for the treated fluid, with the circuit $c_r$ for returning the unsuitably treated fluid and with the circuit $c_n$ for cleaning the treatment circuit c. These three tanks 30, 31 and 32 are provided with pump systems 33, 34, 35 for respectively injecting the fluids into the various corresponding circuits.

What we claim is:

1. An apparatus for treating a fluid consisting of waste-waters and sludges comprising:
    means for irradiating the fluid with a beam of accelerated charged particles including a high-voltage source, a microwave generator G connected to said source, two linear electron accelerators $A_1$ and $A_2$ arranged parallel to each other for receiving identical microwave signals from said generator and producing substantially identical beams $F_1$ and $F_2$ of accelerated electrons, two deflectors $D_1$ and $D_2$ arranged downstream of said accelerators $A_1$ and $A_2$ for respectively deflecting beams $F_1$ and $F_2$ through angles of $\pm\theta$, two magnetic scanning systems $B_1$ and $B_2$ arranged downstream of the deflectors $D_1$ and $D_2$ for receiving the deflected beams and producing scanning beams $F_{10}$ and $F_{20}$;
    means for obtaining a constant flow of the fluid to be treated;

means for controlling said flow;

an irradiation duct C of rectangular cross-section through which said fluid is conducted with two windows in the path of said scanning beams $F_{10}$ and $F_{20}$, and transparent to said scanning beams, said duct conducting a sheet of fluid on two opposite sides of said duct, which sheets are irradiated by said beams $F_{10}$ and $F_{20}$;

means for measuring and controlling the irradiation dose received by said fluid in said duct; and means connected to said measuring and controlling means for stopping the flow of fluid and recycling any fluid which has not been suitably treated.

2. An apparatus for waste-water and sludge treatment as claimed in claim 1, wherein said stopping and recycling means include valves which enable the fluid treatment circuit to be isolated, a return circuit which enables any fluid which has not been suitably treated to be returned upstream of said duct, a microprocessor controlling the automatic closure of an upstream valve and a downstream valve from said duct and the opening of purge valves for returning the fluid upstream of the duct, said microprocessor being associated with said means from controlling the flow of fluid to be treated, said flow being regulated by means of an electropneumatic regulator, said microprocessor being further associated with said means for measuring and controlling the irradiation dose of the irradiation beams $F_{10}$ and $F_{20}$.

3. An apparatus for waste-water and sludge treatment as claimed in claim 2, further including an auxiliary circuit equipped with valves for supplying cleaning fluid to pipes supplying said fluid to and removing said fluid from said duct to enable said pipes to be cleaned.

4. An apparatus for waste-water and sludge treatment as claimed in claim 1, wherein the two windows are rectangular in shape and have a length substantially equal to the length of the rectangular cross-section of said duct.

5. An apparatus for waste-water and sludge treatment as claimed in claim 1, wherein said two windows are rectangular in shape and have a length substantially equal to half the length of the rectangular cross-section of said duct.

6. An apparatus for waste-water and sludge treatment as claimed in claim 1, wherein the distances $L_1$ and $L_2$ between said accelerators and their associated deflectors are equal, and said deflectors enable said beams $F_1$ and $F_2$ to be deflected respectively through an angle $\theta$ and $-\theta$, $|\theta|$ being less than 90° in such a way that the mean trajectories of said beams $F_{10}$ and $F_{20}$ impinge obliquely on the opposite faces of said duct and do not interfere with one another.

7. An apparatus for waste-water and sludge treatment as claimed in claim 1, wherein said deflectors $D_1$ and $D_2$ are arranged at distances from the output ends of the associated accelerators which are different of each other, the deflectors $D_1$ and $D_2$ enable the beams $F_{10}$ and $F_{20}$ to be deflected through an angle $|\theta|=90°$, the elongation of each of the scanning beams obtained being substantially equal to the length of the rectangular cross-section of said duct, said two magnetic deflection systems being arranged on either side of said duct, one portion of each of said beams $F_{10}$ and $F_{20}$ being intercepted by one of faces of said duct C, the other portions of each of the beams $F_{10}$ and $F_{20}$ passing through oe of the two magnetic deflections systems to impinge on the other face of said duct, so that each of said scanning beams enables the half of the two opposite faces of said duct to be irradiated.

8. An apparatus for waste-water and sludge treatment as claimed in claim 1, wherein said duct C is made of stainless steel and the windows of titanium.

* * * * *